United States Patent [19]
DiCecco et al.

[11] Patent Number: 5,452,287
[45] Date of Patent: Sep. 19, 1995

[54] METHOD OF NEGOTIATION OF PROTOCOLS, CLASSES, AND OPTIONS IN COMPUTER AND COMMUNICATION NETWORKS PROVIDING MIXED PACKET, FRAME, CELL, AND CIRCUIT SERVICES

[75] Inventors: Stephen DiCecco, Quincy; Steven R. Cook; Anthony J. Risica, both of Franklin, all of Mass.

[73] Assignee: Motorola, Inc., Schaumburg, Ill.

[21] Appl. No.: 123,654

[22] Filed: Sep. 20, 1993

[51] Int. Cl.⁶ .............................................. H04L 12/26
[52] U.S. Cl. ........................................ 370/17; 370/79; 370/110.1; 395/500
[58] Field of Search .................. 370/13, 17, 60, 60.1, 370/62, 79, 91.4, 94.2, 99, 110.1; 395/500

[56] References Cited

U.S. PATENT DOCUMENTS

| | | | |
|---|---|---|---|
| 5,142,528 | 8/1992 | Kobayashi et al. | 370/79 |
| 5,224,098 | 6/1993 | Bird et al. | 370/110.1 X |
| 5,295,139 | 3/1994 | Palmer | 370/110.1 X |
| 5,357,625 | 10/1994 | Arends | 395/500 |

*Primary Examiner*—Melvin Marcelo
*Attorney, Agent, or Firm*—J. Ray Wood

[57] ABSTRACT

The network negotiates user protocols, classes, and options between a calling user and a called user using the results to determine an optimal method of user information transport. A strategy for determining the optimal user information transport method from negotiated user protocols, classes and options includes querying the destination edge for destination related PC&O, sending this information back to the source and subsequently proceeding with traditional source to destination call processing.

15 Claims, 4 Drawing Sheets

METHOD OF NEGOTIATION OF PROTOCOLS, CLASSES, AND OPTIONS IN COMPUTER AND COMMUNICATION NETWORKS PROVIDING MIXED PACKET, FRAME, CELL, AND CIRCUIT SERVICES

FIELD OF THE INVENTION

This invention concerns communication and computer networks.

BACKGROUND OF THE INVENTION

Modern computer and communication networks are capable of supporting calls to and from a variety of network user equipment. The network user equipment may utilize many different protocols, classes and options (PC&O) as part of their normal operation. There are several protocol possibilities, each with its own set of classes and options, which may exist at a time for any given piece of user equipment attached to the network. To provide optimal network service across all PC&O variations, the network therefore supports a variety of packet, frame, cell, and/or circuit based user information transport methods internal to the network.

To determine which PC&O to use, calling and called network users "negotiate" between themselves and the network, at call establishment time, in a three-party exchange. The PC&O provides the network with enough information during call negotiation to select the appropriate method for user information transport. The network negotiation should be accomplished without unduly constraining any user-to-user negotiation taking place over and above that occuring internal to the network during call establishment.

Several problems are attendant in this process. The mismatch of PC&O between calling and called users create a problem for network implementation. Frequently, the network is not made aware of a user's PC&O requirements until the user requests a call from the network. Similarly, the network may be unaware of the called user's PC&O requirements until after the called user responds to a network notification of an incoming call. The network must consolidate and harmonize the potential PC&O differences to determine the appropriate method for user information transport to be used in support of the call. Furthermore, the PC&O requirements of the calling user may combine with PC&O requirements of the called. user so as to affect the resources which must be allocated to the call to support the method of user information transport.

Present computer network provide single methods of user information transport. In Present negotiation strategies require that the network negotiate between calling and called users in a singly circular fashion, passing PC&O from the calling user (source) to the called user(s) (destination(s)) and return. As the network does not aquire PC&O from both the source and destination(s), the method of user information transfer by the network is not optimized for the finally negotiated PC&O. Calls are implemented in present compute networks simply by applying user information transport methods which may vary only in protocol options and not by protocol and class.

In addition, if PC&O information is known prior to the user's call, then the information for the calling user and the called user must be stored for use by the network. If the PC&O information is stored, whenever a user changes equipment, the stored information about the PC&O must be changed.

If PC&O information could be obtained at call time while still conducting the negotiation effectively, the network could select a method of user information transport optimal for the negotiated user PC&O. Also, obtaining PC&O at call time results in greater flexibility in network operation and maintenance, since user equipment could change while requiring minimal changes configuration information.

DETAILED DESCRIPTION

A method solving this problem is presented herein. A special negotiation strategy is employed during call processing to obtain and coordinate PC&O information from the calling and called network users. The special negotiation strategy involves querying the destination edge for destination related PC&O, sending this information back to the source and subsequently proceeding with traditional source to destination and return call processing.

Figure 1:
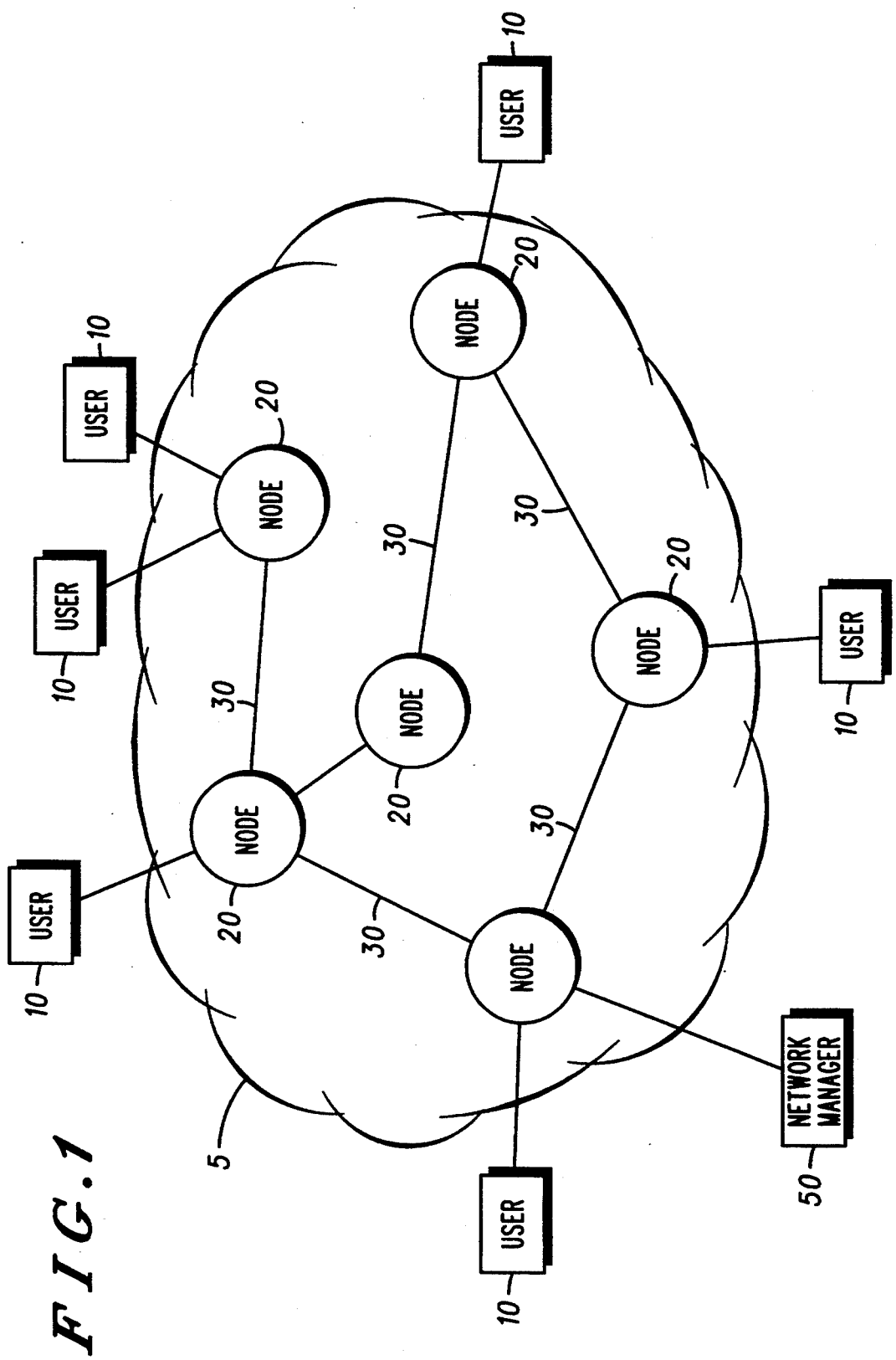
FIG. 1 shows a network.

Referring to FIG. 1, network 5 has a sets of nodes 20, 40. User equipment 10 is connected by physical media 30. User equipment may be fax machines, modems, digital signal processors or computer terminals. Physical media 30 may be telephone lines, cellular telephone links, satellite links, or microwave links.

Logically, user equipment 10 is attached at the edges of the network 5. User equipment 10 is attached to edge nodes 20. All other nodes are intermediate nodes 40.

The links 30 between nodes 20, 40 may be logical subdivisions of the actual physical links connecting network 5. These logical internodal links 30 may transparently overlay physical medial and telecommunication equipment in the public network and are relatively static. Typically, the internodal link is the entire physical link, although it may occupy only part of the physical link. A single physical link may contain multiple internodal links.

Network manager 50, comprising at least one computer, manages addressing, as call endpoints, for the network nodes. However, the network manager does not directly participate in the negotiations involved in call setup.

Each edge node 20 maintains call endpoint information for each user's address, which is defined local to that particular edge node. User's addresses are said to be local to a node if the addressed user's equipment is connected to the node via some physical media. Calling users (source) signal the network to place calls passing PC&O in the process. The source edge node queries the destination edge network node for the PC&Os supported by the destination. The destination edge may be required to obtain PC&O from the destination to respond. Upon response to the PC&O query issued by the source node and therfore armed with information from both edges, the source node can determine the appropriate method for the transport of user information by the network. The PC&O information from the destination edge is combined with the source PC&O information and is considered fully negotiated. The negotiated PC&O is used to determine and implement an optimal method for user information transport thereby completing the call.

Figures 1, 2:
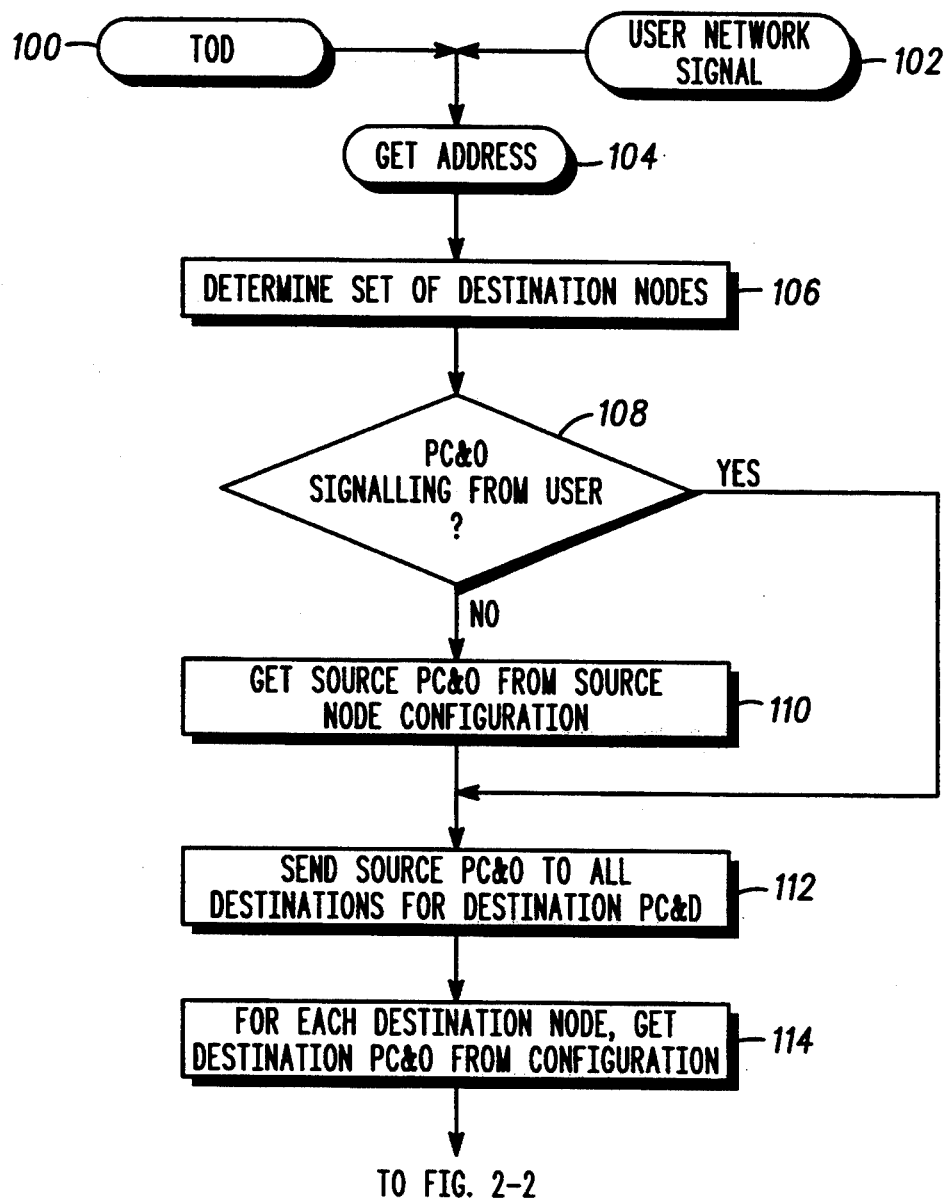
FIGS. 2.1, 2.2, & 2.3 show a flowchart for PC&O determination for the network.
Figure 2:
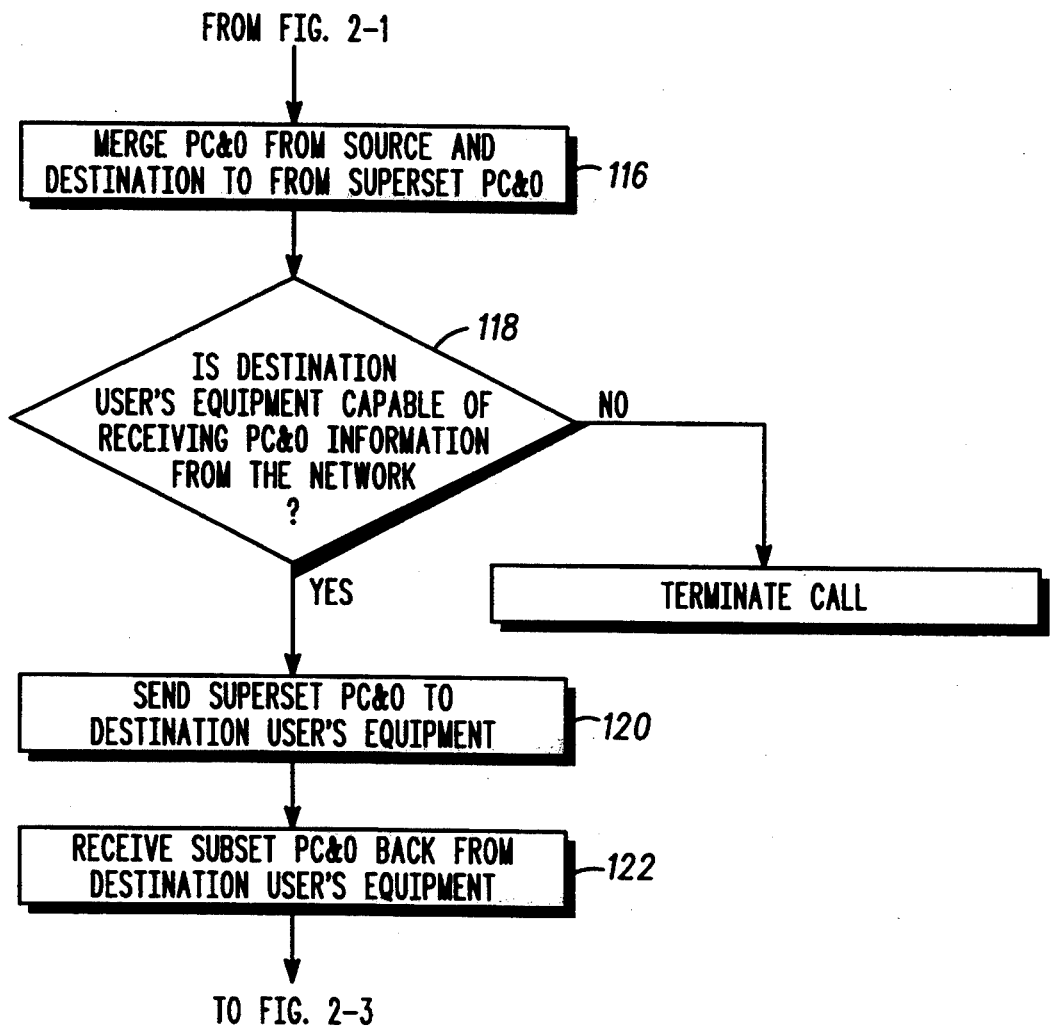
Figures 2, 3:
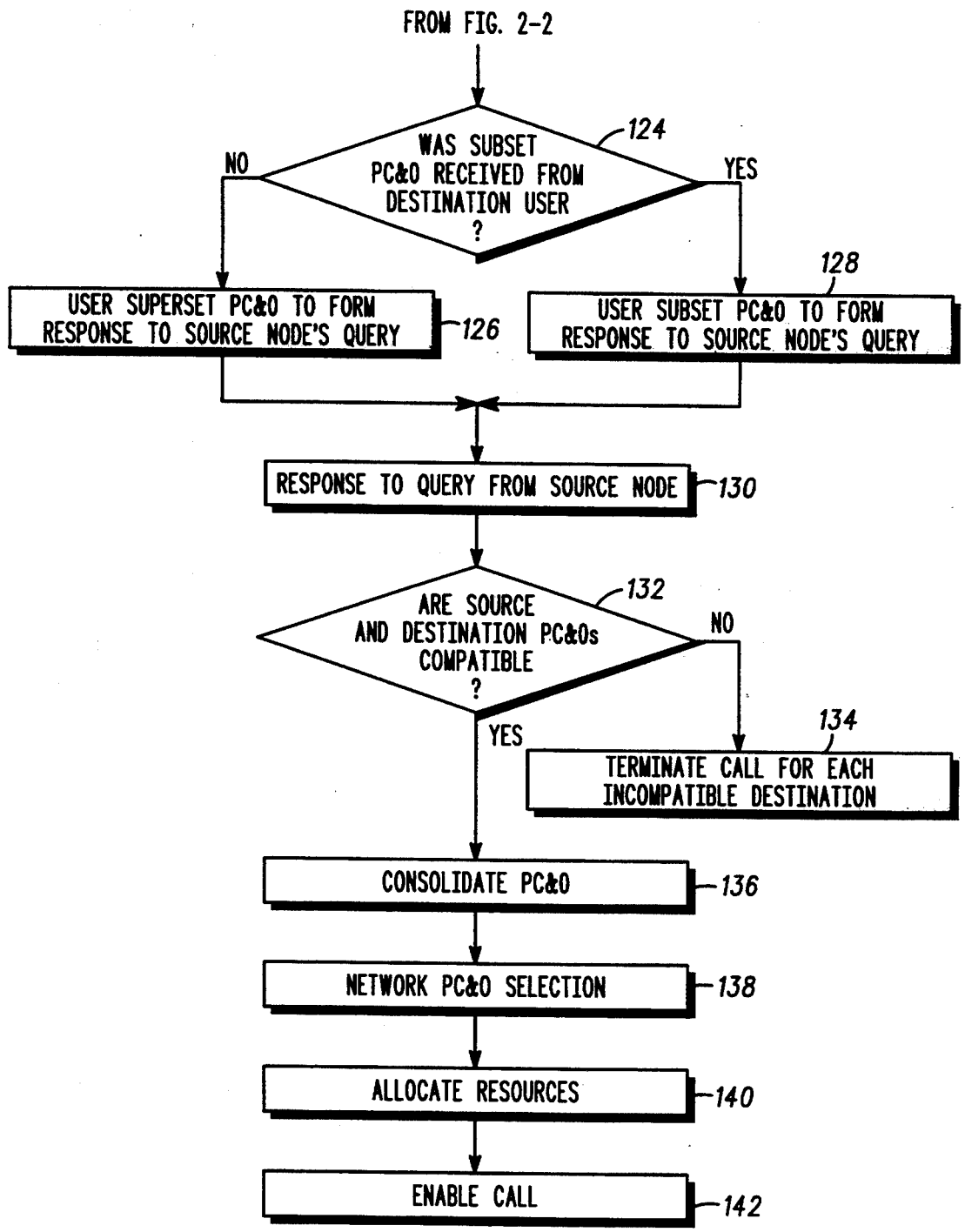

FIGS. 2.1, 2.2, and 2.3 show a flowchart showing how a network user's call is handled by the source and destination edge nodes. These network nodes must negotiate a final set of PC&O between the calling user equipment, the called user equipment, and the network. The PC&O, thus determined, provides the source edge node with enough information to select the appropriate user information transport method, while not unduly constraining any end user-to-user negotiation. All information exchanged is assumed to be in terms of PC&O.

Refering to FIGS. 2.1, 2.2, and 2.3 the improved negotiation algorithm has two starting states (steps 100, 102) representing the user's request of the network to initiate a call on the user's behalf. The user may have chosen to initiate the call upon a specific time of day (step 100) or by communicating directly with the network (step 102).

The network node to which the originating user's equipment is attached (source edge node) determines the set of addresses corresponding to the call's participants (step 104). These addresses are defined to be the source address and destination addresses corresponding the calling and called parties. These addresses may have come from either configuration or may have been passed to node directly by the user/user equipment.

Using the addresses thus determined, the edge node to which the originating (call) user equipment is attached determines the set of destination edge nodes (step 106).

Having determined the set of destination edge nodes, the source edge node seeks the PC&Os employed by the source user's equipment.

If PC&O related to the calling user was not passed to the network as information embeded in the user's call request (step 108), the source node fetches such information from its own local configuration data as determined by the calling user's address (step 110). Otherwise, the PC&O received from the calling user's equipment is used.

The source node the queries all destination edge nodes, passing the addresses of the called party, asking for the PC&O associated with each destination user's equipment as identified by the called address received in the query (step 112). Destination edge nodes are identified at the source node by local lookup on the addresses of the called user's equipment. The queries are supported by protocols internal to the network manger 50, which exist solely in support of the network and whick are unrelated to the PC&O being negotiated between users by the network.

Each destination node receiving a query requesting PC&O for addressed called parties performs identical functions. The destination node uses the destination addresses passed in the query from the source node to lookup a list of PC&O possibilities supported by the called user's equipment (step 114). This is then merged with that received from the source node query to produce a superset of PC&O from both the source node and destination node (step 116). If the user equipment is attached to the destination edge node of the network in such a fashion that it is possible for the network to communicate the superset PC&O in a notification of an incoming call (step 118), this is accomplished at this time by the destination node (step 120).

In this case, the destination user's equipment may reply to the notification of an incoming call by responding in the positive and passing the subset of the superset PC&O which it is willing to support back to the destination edge network node (step 122). If the destination user's equipment selected a subset of the superset PC&O (step 124), that subset is used to form a repy to the source node's query (126). Otherwise, the superset PC&O is used instead to form the reply (step 128). In either case, the destination node replies to the source node's query providing a set of PC&O supportable by the destination user's equipment (step 130).

Upon receipt of query responses from all queried, destinations, the source edge node attempts to select a final PC&O set by combination of the PC&O information associated with the calling and called user's equipment used in conjunction with locally configured information (step 132). If the combination of source and destination PC&O are noncompatible, the call is terminated (step 134) control transfers to the initial states (steps 100, 102). Otherwise, the source selects the final PC&O set as defined above (stpe 136).

Having selected the final PC&O set to be used by the network in support of the users call, the source edge node uses this result, the final PC&O, to select a method for transporting the user's information internal to the network which guarantees the traffic characteristics described by the PC&O negotiated between users and the network (step 138). The network allocates any internal resource required to support the transport of user information by the network (step 140) and activates these resources thereby enabling the call for the network users (step 142).

We claim:

1. A method for processing calls for a cell relay network, the network connecting a plurality of network users, the network users connected to the network through a plurality of nodes, the network having diverse sets of user protocols, classes, and options (PC&O) where such protocol information about each network user is maintained at the node connecting the network user to the network, the method comprising the steps of:

(a) having a call made by a source user attached to a source node, the call being made to a set of destination users attached to a set of destination nodes;

(b) at the source node, locating the set of destination nodes;

(c) at the source node, conferring with the set of destination nodes to determine the set of PC&O associated with each destination user;

(d) combining PC&O from the source node and the set of destination nodes; and (e) determining the protocol used for transport of user information across the network.

2. The method of claim 1 where step (a) includes the additional step of the source user requesting a call.

3. The method of claim 1 where step (a) includes the additional step of calling at a time of day (TOD).

4. The method of claim 1 where step (b) includes the step of determining a set of addresses identifying the source user and the set of destination users.

5. The method of claim 4 including the additional step of, for each address in the set, using that address to determine the associated destination node.

6. The method of claim 5 where step (c) includes the additional step of determining source user PC&O based upon the address of the source user, if such PC&O were not provided to the network by the source user when the attempted call was placed.

7. The method of claim 6 where step (c) includes the additional step of transmitting the PC&O from the source node to the set of destination nodes.

8. The method of claim 7 where step (c) includes the additional step of determining destination user PC&O based upon the address of the destination user, if such PC&O cannot be provided to the network by the destination user.

9. The method of claim 8 where step (d) includes the step of determining whether the source user PC&O and the destination user PC&O can be harmonized.

10. The method of claim 9 includes the step of consolidating, into a uniform set of user traffic characteristics, the source user PC&O with the destination user PC&O if the source user PC&O and the destination user PC&O are compatible or can be harmonized by use of internal network resources.

11. The method of claim 8 includes the step of terminating the call if the source user PC&O cannot be harmonized with the destination user PC&O.

12. The method of claim 10 including the step of determining the optimum set of protocols to be used internally by network to guarantee the user traffic characteristics during the transport of the user data.

13. The method of claim 12 including the step of allocating network resources to transport user data pursuant to the consolidated user traffic characteristics.

14. The method of claim 13 including the step of enabling the network to transport user data between source users and destination users.

15. A method for processing calls for a cell relay network, the network connecting a plurality of network users, the network users connected to the network through a plurality of nodes, the network having diverse sets of user protocols, classes and options (PC&O) where PC&O about each network user is maintained at the node connecting the network user to the network, the method comprising the steps of:

(a) having a call made by a source user attached to a source node, the call being made to a set of destination users attached to a set of destination nodes;

(b) at the Source node locating the set of destination nodes by:
   (1) determining a set of addresses identifying the source user and the set of destination users and;
   (2) using that address to determine the associated destination node;

(c) at the source node, conferring with the set of destination nodes to determine the set of PC&O associated with each destination user by:
   (1) determining source user PC&O based upon the address of the source user, if such PC&O were not provided to the network by the source user when the attempted call was placed;
   (2) transmitting the PC&O from the source node to the set of destination nodes; and
   (3) determining destination user PC&O based upon the address of the destination user, if such PC&O cannot be provided to the network by the destination user;

(d) determining whether the source user PC&O and the destination user PC&O are compatible or can be harmonized;

(e) if the source user PC&O and destination user PC&O are compatible or can be harmonized, consolidating PC&O from the source node and the set of destination nodes into an optimum set of uniform traffic characteristics, otherwise terminating the call;

(f) determining the PC&O used for transport of user information across the network;

(g) allocating network resources to transport user data pursuant to the consolidated user traffic characteristics; and (h) enabling the network to transport user data between source users and destination users.

* * * * *